Sept. 25, 1951         J. S. STULL         2,568,775
APPARATUS FOR FEEDING AND CUTTING COILED MATERIAL
Filed July 8, 1946         7 Sheets-Sheet 1
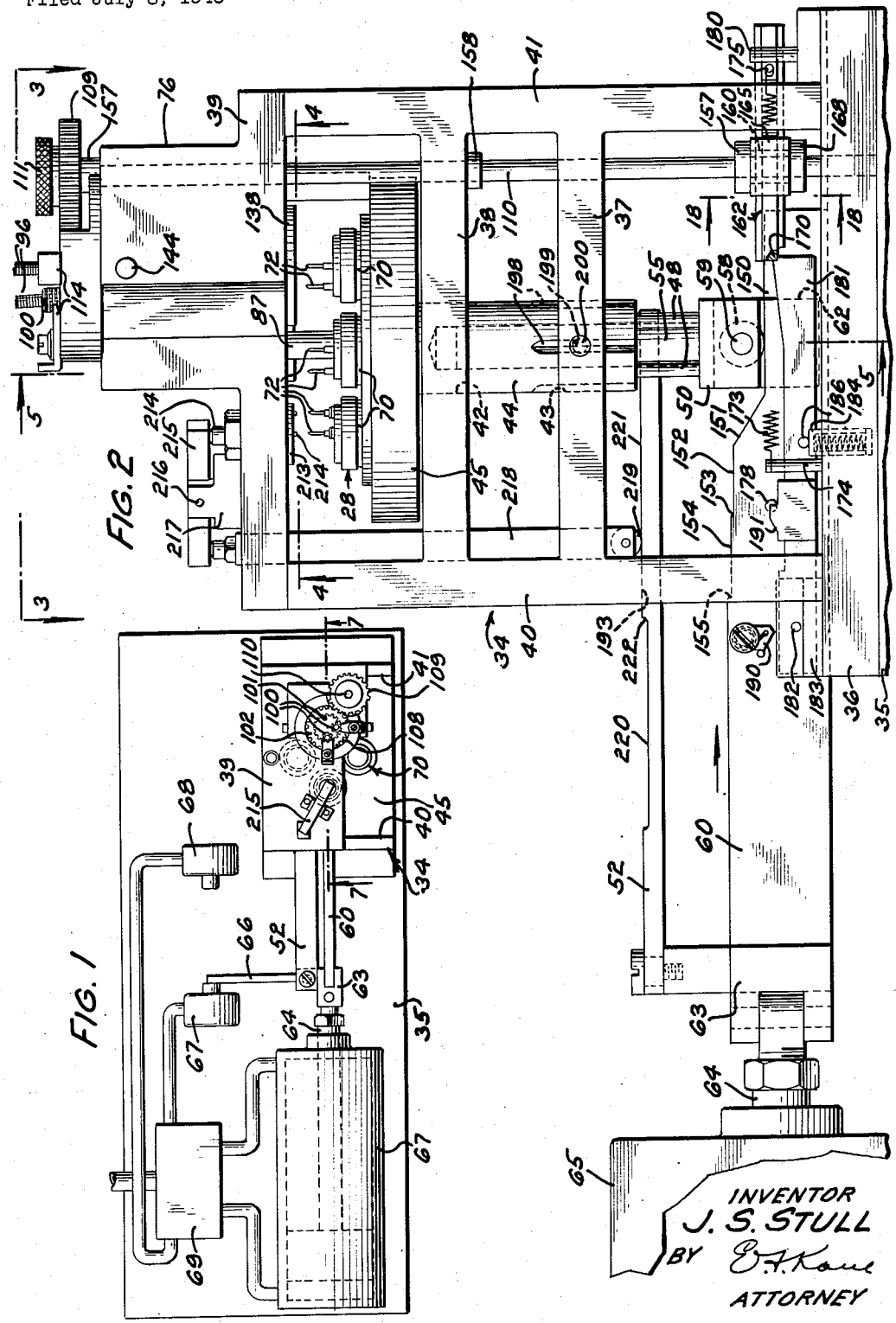
INVENTOR
J. S. STULL
BY
ATTORNEY

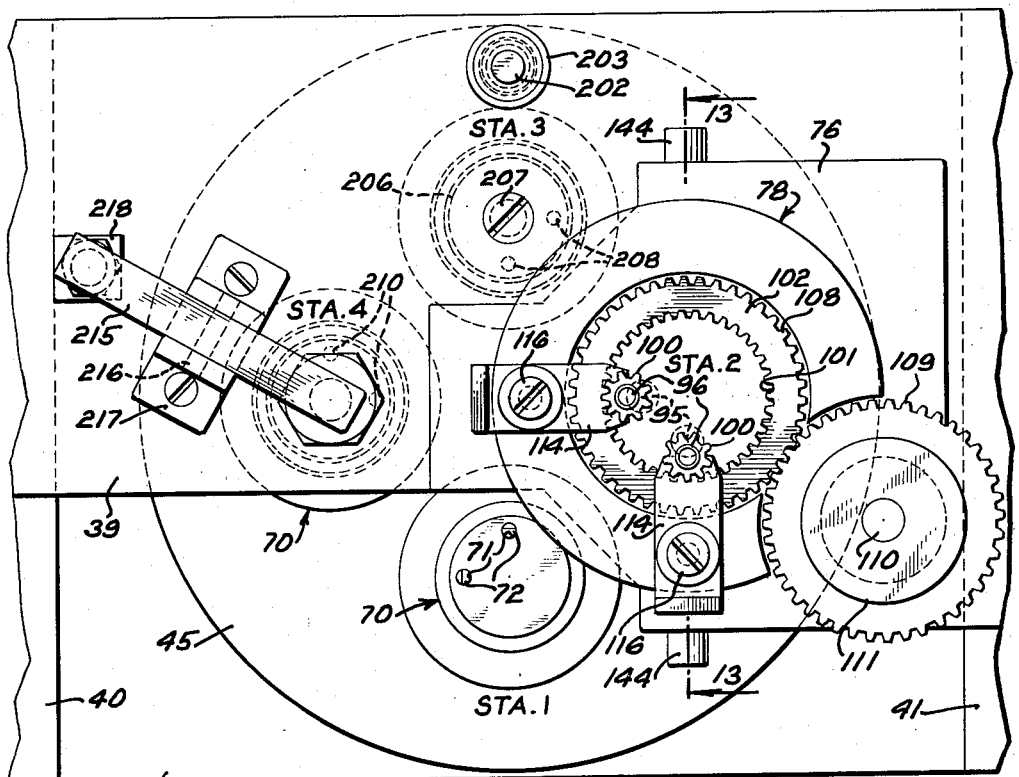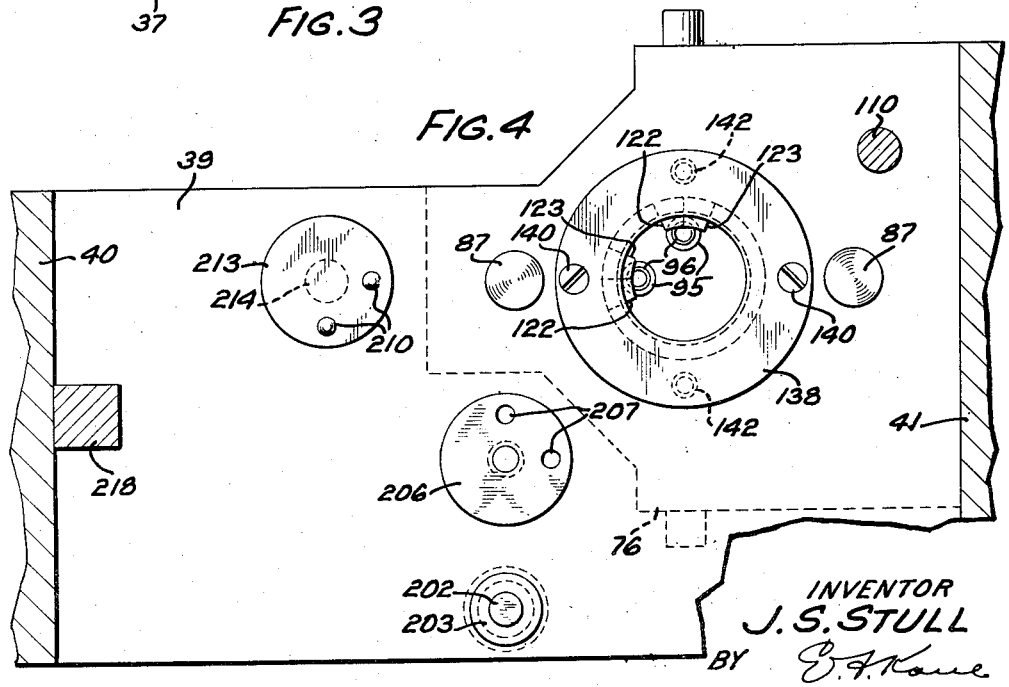

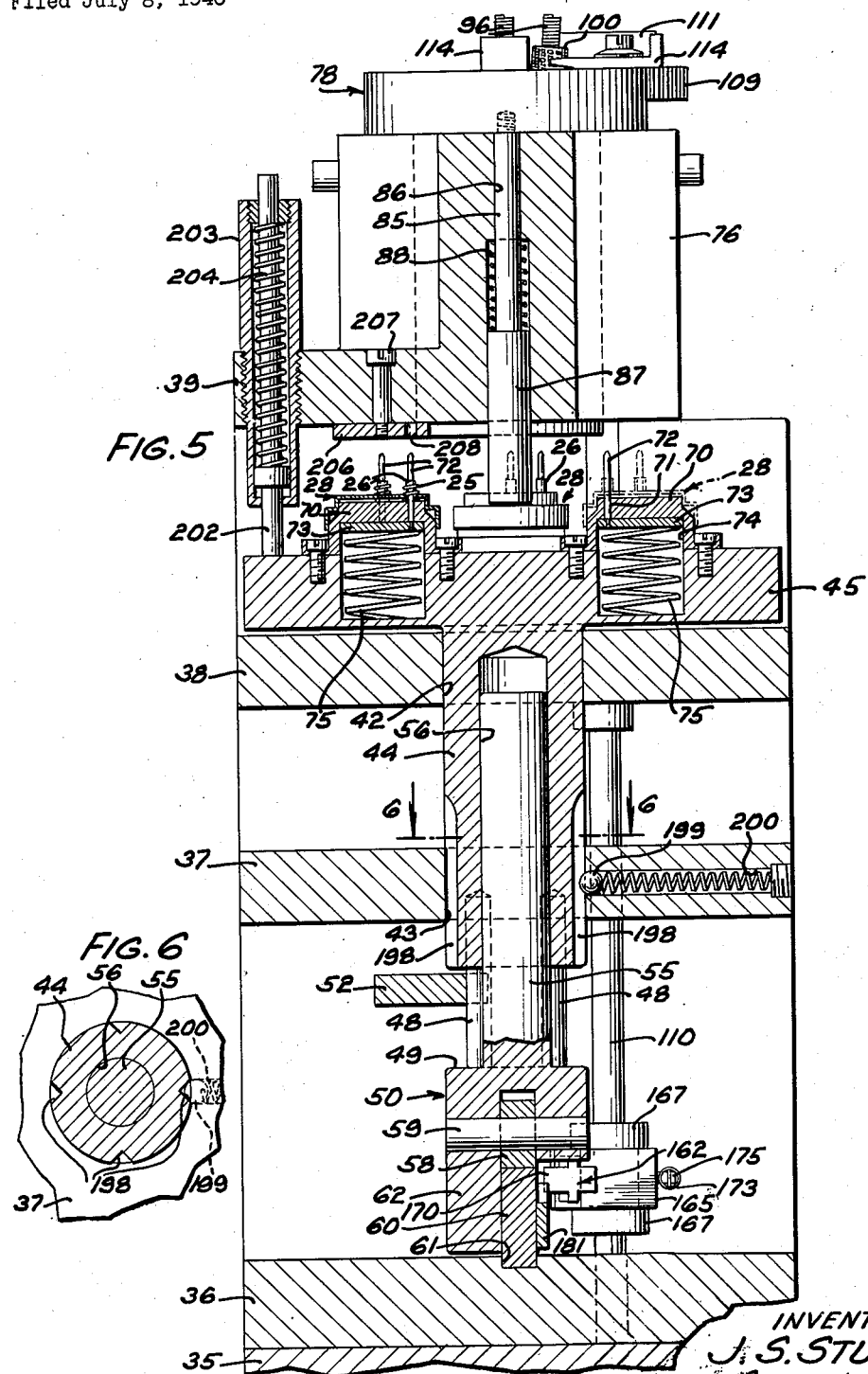

Sept. 25, 1951 J. S. STULL 2,568,775
APPARATUS FOR FEEDING AND CUTTING COILED MATERIAL
Filed July 8, 1946 7 Sheets-Sheet 4
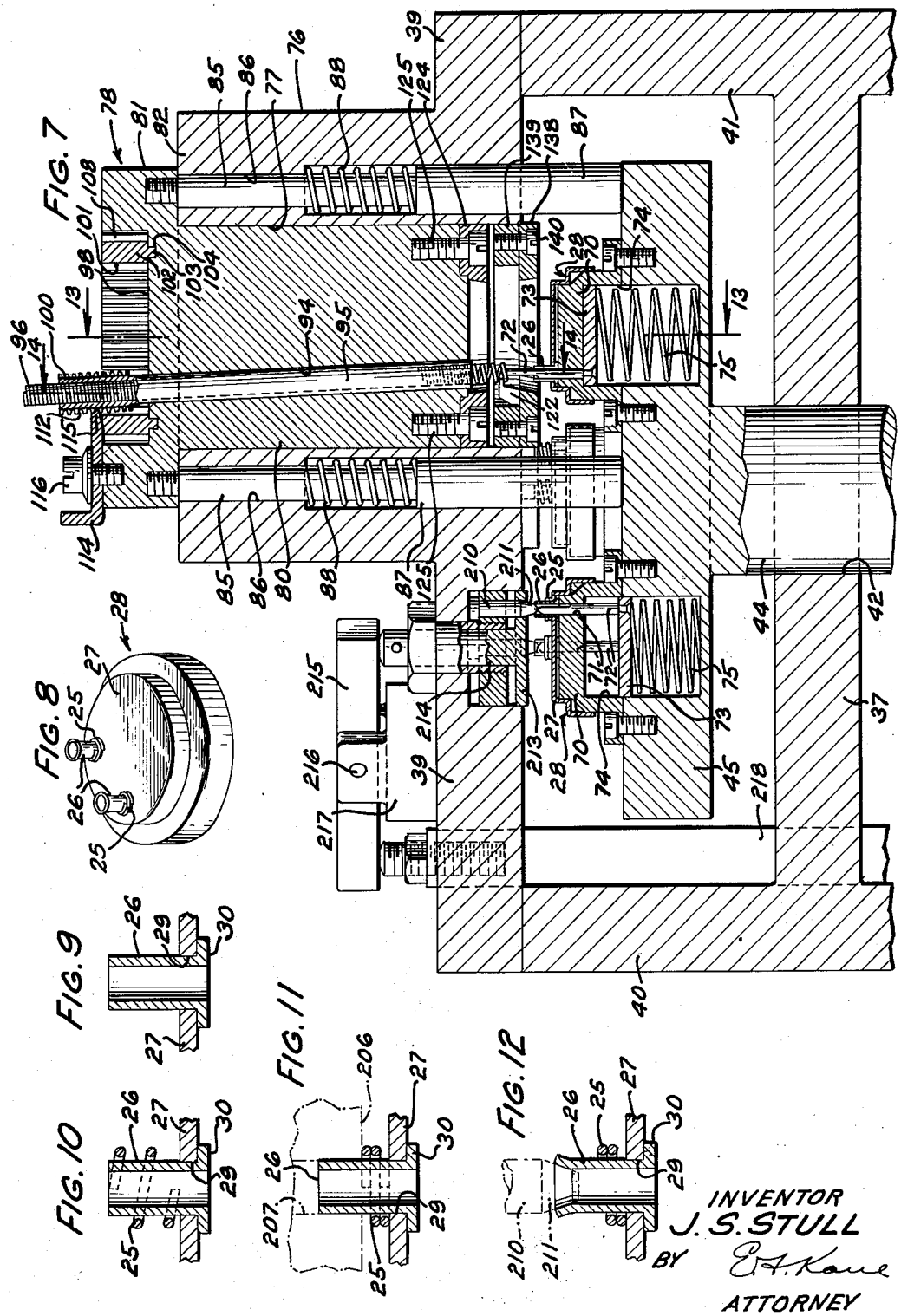
INVENTOR
J. S. STULL
BY
ATTORNEY

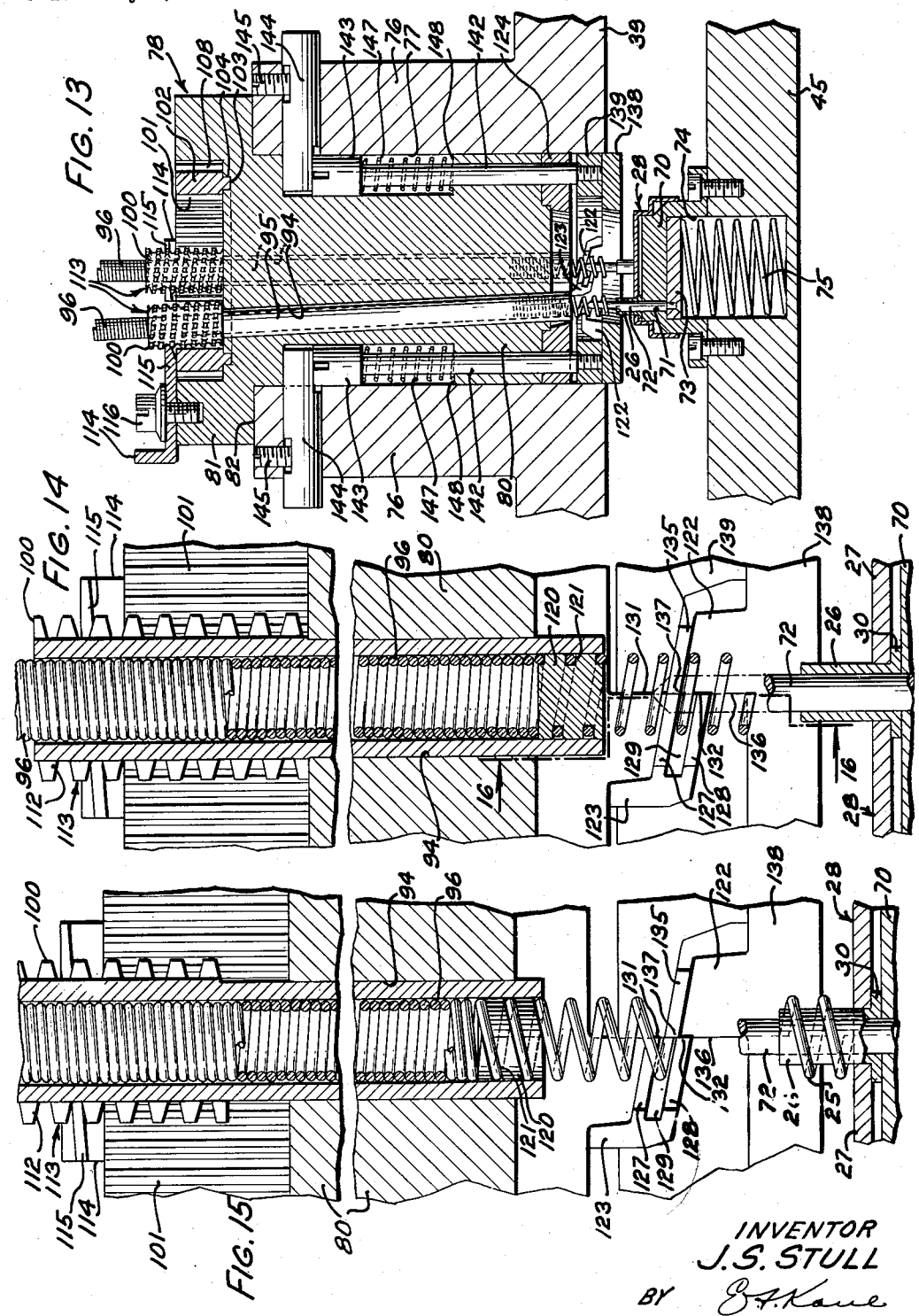

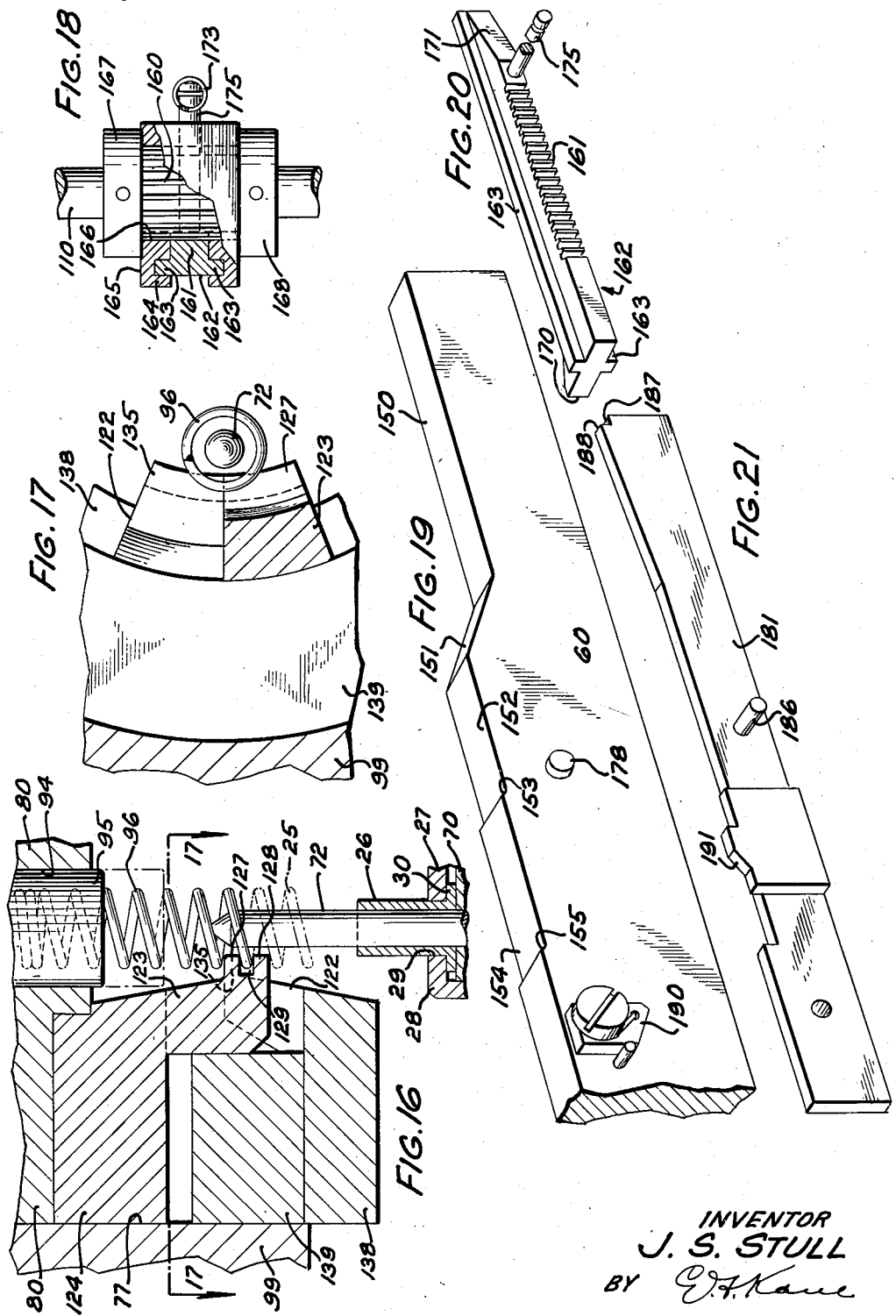

Sept. 25, 1951  J. S. STULL  2,568,775
APPARATUS FOR FEEDING AND CUTTING COILED MATERIAL
Filed July 8, 1946  7 Sheets-Sheet 7
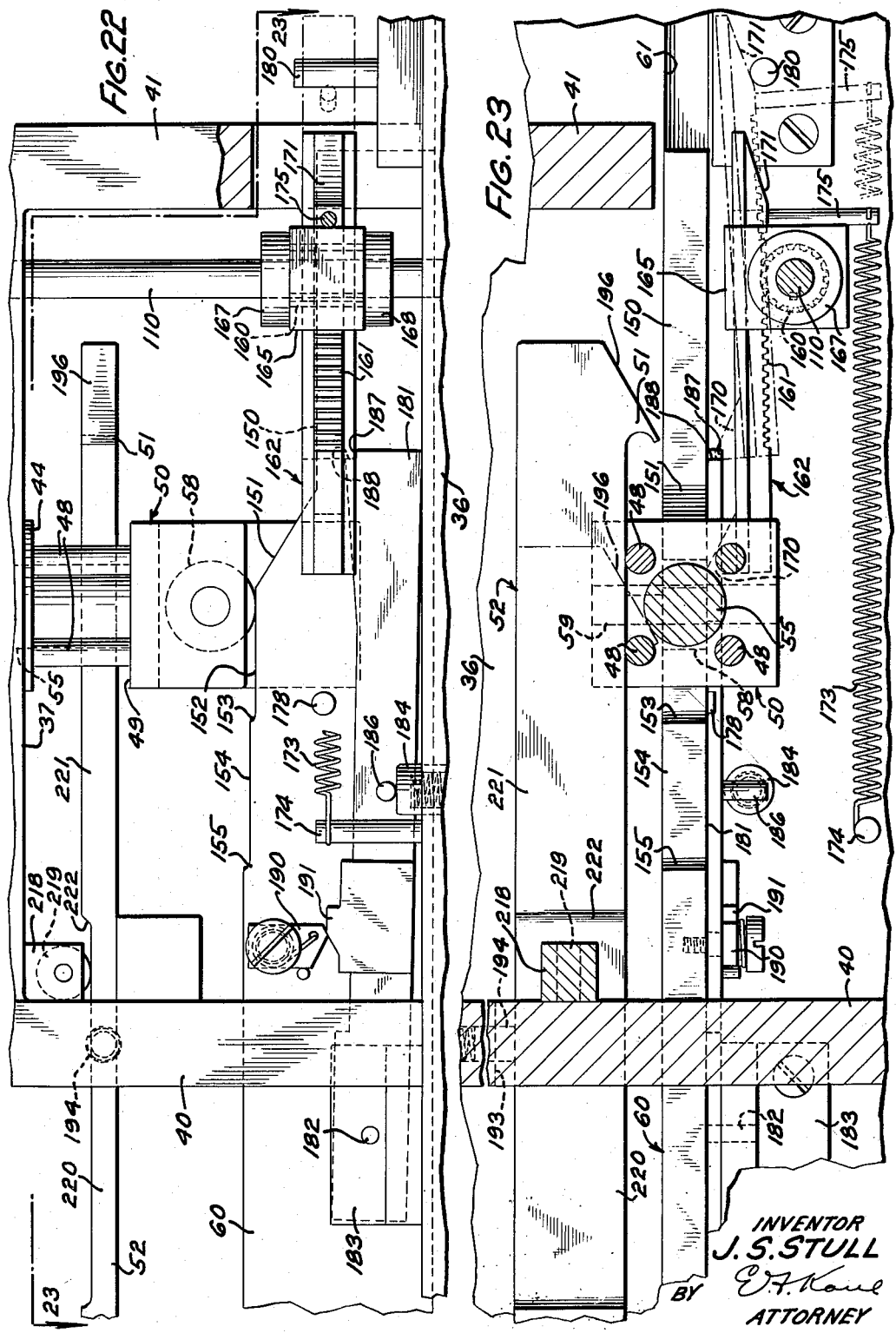
INVENTOR
J. S. STULL
BY
ATTORNEY Patented Sept. 25, 1951

2,568,775

UNITED STATES PATENT OFFICE 2,568,775

APPARATUS FOR FEEDING AND CUTTING COILED MATERIAL

John S. Stull, Chicago, Ill., assignor to Western Electric Company, Incorporated, New York, N. Y., a corporation of New York Application July 8, 1946, Serial No. 682,112

19 Claims. (Cl. 164—48)

This invention relates to an apparatus for forming and assembling parts and more particularly to an apparatus for feeding a coil of wire wound in a helix, severing a portion of the coil of wire to form an annulus, assembling the annulus onto an article, and deforming a portion of the article to retain the annulus thereon.

Some base members of metallic electronic vacuum tubes have a plurality of separately formed eyelets projecting therefrom and bonded thereto. To insure that the juncture between the base member and the eyelets is air-tight, each juncture is sealed with a brazing material in a subsequent brazing operation which, when done by hand, is very inefficient. The brazing operation may be expeditiously performed by assembling an annulus of brazing material around each eyelet and subjecting the assembly to a brazing temperature.

It is an object of the present invention to provide an apparatus for effectively and efficiently forming and assembling parts.

In one embodiment of the present invention, a vertically reciprocable table is provided for receiving, in predetermined positions thereon, a plurality of articles each having a plurality of tubular eyelets bonded thereto and extending upwardly therefrom and which table is intermittently rotated through 90° to align the article successively with various stations of the apparatus. At one of the stations, the eyelets of the article are positioned in vertical alignment with helically wound coils of brazing wire, several convolutions of which are fed past pairs of cutting jaws which are actuated by the upward movement of the table to sever from the helical supply of brazing wire the coils thus formed by the several convolutions. The severed coils which form annuli of brazing material are guided onto the eyelets of the article and the table is rotated 90° to position the article at the next station under a compressing die which, as the table is being moved upwardly, compresses the coils on the eyelets into compact form, after which the table is again indexed to align the eyelets of the article with flaring tools at the following station, which flaring tools engage and flare the ends of the eyelets as the article is moved upwardly by the table, after which operation the table is indexed and the completed assembly removed.

A more complete understanding of the invention may be had by reference to the following detailed descripiton and the accompanying drawings illustrating a preferred embodiment thereof wherein Fig. 1 is a reduced plan view of the apparatus;

Fig. 2 is an enlarged front elevational view of the apparatus shown in Fig. 1 with parts broken away and showing the table for supporting the articles thereon in its lowermost position;

Fig. 3 is an enlarged plan view of a portion of the apparatus indicated by the line 3—3 on Fig. 2 and showing the feed table and the upper horizontal frame plate and the parts supported thereby;

Fig. 4 is a bottom plan section taken on the line 4—4 of Fig. 2 showing the upper frame plate and the parts carried thereby;

Fig. 5 is a vertical transverse sectional view taken on the line 5—5 of Fig. 2 in the direction of the arrows and showing the feed table in its lowermost position;

Fig. 6 is a fragmentary plan sectional view taken on the line 6—6 of Fig. 5 showing the means for maintaining the table in angularly adjusted position;

Fig. 7 is a vertical longitudinal sectional view of the upper portion of the apparatus taken on the line 7—7 of Fig. 1 in the direction of the arrows and showing the supporting table moved upwardly to an intermediate position and showing the supply of helically formed brazing wire in its upper or retracted position;

Fig. 8 is a perspective view of the completed article showing the tubular elements or eyelets extending upwardly therefrom with a coil of brazing wire assembled on each of the eyelets and showing the ends of the eyelets flared;

Fig. 9 is an enlarged fragmentary sectional view of the article showing the relation between the eyelet and a portion of the article;

Fig. 10 is a sectional view similar to that of Fig. 9 showing a coil of brazing wire assembled thereon in expanded condition;

Fig. 11 is a view similar to Fig. 10 showing the coil in compressed condition and showing, in dotted lines, a die for compressing the coil;

Fig. 12 is a view similar to Fig. 11 showing the end of the eyelet flared and in engagement with the flaring tool, indicated in dotted lines;

Fig. 13 is a vertical transverse sectional view through the upper portion of the apparatus taken on the line 13—13 of Figs. 3 and 7 and showing the article supporting table in intermediate position and showing feed tubes and the helical wire supported thereby with the tubes in their advanced or lower position;

Fig. 14 is an enlarged fragmentary sectional view through a feed tube for feeding the brazing wire, with parts broken away, taken on the line 14—14 of Fig. 7, showing the relationship between the article, the helical supply of brazing wire, and the feed tube therefor and showing a pair of relatively movable cutting members associated with the coil of brazing wire for severing it;

Fig. 15 is a view similar to that of Fig. 14 showing the parts in changed position and showing a coil of brazing wire severed from the supply and in assembled relation on the eyelet of the article;

Fig. 16 is a fragmentary sectional view taken on the line 16—16 of Fig. 14 showing the relation between the cutting members and the supply of brazing wire and showing the supply of brazing wire and the feed tube therefor in the upper or retracted position in full lines and in the advanced or lower position in dotted lines;

Fig. 17 is a fragmentary plan sectional view taken on the line 17—17 of Fig. 16;

Fig. 18 is a sectional view of a portion of the drive mechanism taken on the line 18—18 of Fig. 2 showing a floating movable rack bar meshing with a driving pinion for rotating a vertical drive shaft;

Fig. 19 is a view in perspective of a portion of a reciprocable actuating cam member;

Fig. 20 is a view in perspective of the reciprocable floating rack bar;

Fig. 21 is a view in perspective of a latching member for latching the rack bar shown in Fig. 20 in one position;

Fig. 22 is an enlarged front elevation of a portion of the machine showing some of the means for actuating the apparatus and showing the cam bar illustrated in Fig. 19 in an intermediate position; and Fig. 23 is a plan sectional view of the structure shown in Fig. 22 taken on the line 23—23 of Fig. 22.

The apparatus illustrated in the accompanying drawings serves to form and to assemble an annulus or coil 25 (Figs. 8 and 10) of several convolutions of helically formed brazing wire onto tubular elements or eyelets 26 (Fig. 9) projecting from a dish-shaped base member 27 of an article 28, to press the convolutions of the helical coils into tight engagement with each other (Fig. 11) and to flare the end of the eyelets 26 (Fig. 12) to prevent accidental removal of the coil 25 therefrom. The dish-shaped base member 27 of the article 25, which forms a part of a vacuum tube assembly, is perforated at 29—29 to receive the eyelets 26—26, which project therethrough and are provided with flanges 30. The flanges 30 of the eyelets 26 engage the underneath side of the member 27 and are bonded thereto by a brazing or welding operation. The number of eyelets 26 provided on the various base members 27 varies, only two being shown in the embodiment illustrated herein.

In a subsequent operation, the article 28 and the annuli 25 of brazing material thereon are heated to a brazing temperature to fuse the annuli 25 and seal the juncture between the eyelets 26 and the base member 27 of the article 28.

Generally, the present apparatus comprises a four-station machine, at the first station of which the article 28 may be applied to an intermittently rotatable and vertically reciprocable table and then moved to the second station, where it is positioned in alignment with a helical supply of brazing wire, from which the coil 25 of several expanded convolutions is severed and guided onto the eyelets 26 (Fig. 10), after which the article is moved to the third station, where the convolutions of the severed expanded coil of wire are compressed into tight engagement with each other (Fig. 11), after which operation the article is moved to the fourth station, where the eyelets 26 are moved into engagement with flaring tools (Fig. 12) to flare the ends of the eyelets 26 and, upon the completion of this operation, the article is moved to the first station where the completed assembly is removed.

The apparatus has a main frame 34 (Figs. 1 and 2), which is mounted on a base member 35 and comprises a plurality of horizontal plates, namely, a base plate 36, intermediate plates 37 and 38, and an upper plate 39, spaced apart by and secured to a pair of vertical plates or walls 40 and 41. The intermediate plates 37 and 38 are apertured at 42 and 43 to receive a shaft 44, which has an article supporting table 45 integrally formed therewith at its upper end.

Secured to and extending downwardly from the lower end of the shaft 44 are four supporting rods or pins 48, which engage and rest on the horizontal surface 49 of a supporting member 50. The supporting rods 48 are equally spaced about the axis of rotation of the shaft 44 and are adapted to be engaged by the hook 51 of a horizontally reciprocable actuating member or bar 52 for the purpose of indexing or rotating the table 45 through movements of 90° in a counterclockwise direction, as viewed from above (Fig. 3).

The supporting member 50 has a cylindrical rod or shaft 55 extending upwardly from the surface 49 into a recess 56 of the shaft 44 to serve as a bearing post and to maintain the member 50 in alignment with the shaft 44. A roller 58, rotatably mounted on a pin 59, is provided in the member 50 and rides on the upper surface of a horizontally reciprocable actuating cam member or bar 60 which is slidably mounted in a groove 61 in the base plate 36 and moves into suitable clearance apertures in the vertical walls 40 and 41. The cam member 60, when reciprocated, is adapted to raise and lower the supporting table 45 and actuate driving mechanism, hereinafter described, for feeding the coils of brazing wire. A portion 62 of the member 50 extends downwardly into sliding engagement with the side of the cam member 60 to prevent rotation of the member 50 during the operation of the apparatus.

The actuating members 52 and 60 (Figs. 1 and 2) are respectively pivotally and rigidly connected to a block 63, which, in turn, is connected to one end of a piston rod 64 of a fluid operated actuator 65. The piston 64 is reciprocated through distances of predetermined length at a controlled rate of movement and at the end of each stroke the direction is automatically reversed by means comprising an arm 66 secured to and extending horizontally from the block 63, which arm 66 alternately engages and actuates reversing valves 67 and 68 hydraulically connected to the main control valve 69 to automatically actuate the valve 69 and reverse the flow of fluid into the fluid actuator 65.

The table 45 is provided with four circular positioning members or seats 70 equally spaced about the axis of rotation thereof for receiving and supporting the dish-shaped articles 28 thereon with the tubular elements 26 extending upwardly therefrom, as shown in Figs. 5, 7 and 13. The members 70 are apertured at 71—71 to receive positioning pins 72—72 vertically extending therethrough, which are arranged to receive the eyelets 26 and position the article 28 in proper angular relation on the seats 70. The pins 72 are vertically movable and are secured at their lower ends to disc members 73, which are urged upwardly into recesses 74 of the members 70 by expansion springs 75 mounted in recesses in the table 45. It will readily be seen that the articles 28 may be placed on the positioning members 70 mounted on the table 45 and the table 45 may be vertically reciprocated and in timed relation thereto rotated intermittently in increments of 90° to advance the article through a complete revolution about the axis of the table.

The upper plate 39 of the frame of the apparatus is shaped and positioned to overlie three of the seats 70 on the table 45 (see Fig. 3) and to leave one of the seats 70 accessible to the operator. The accessible seat 70 may be considered as located at station No. 1 (Fig. 3) and the other seats 70, following in a counterclockwise direction, are aligned with stations Nos. 2, 3 and 4, respectively, of the apparatus.

The upper plate 39 is provided with an upwardly extending boss 76 (Figs. 7 and 13), which is apertured at 77 to receive a head 78 slidably mounted therein and in axial alignment with the seat 70 at station No. 2. The head 78 comprises a cylindrical block 80 fitting in the recess 77 and an upper flange portion 81 adapted to seat against the upper surface 82 of the boss 76. A pair of rods 85—85 (Fig. 7) secured to the underneath side of the flange 81 of the head 78, extend vertically downwardly therefrom through apertures 86—86 and terminate in enlarged ends 87. The ends 87—87 of the rods 86—86 extend below the plate 39 and are spaced from the table 45 when the table is in its lowermost position and are adapted to be engaged by the table 45 and moved upwardly thereby various predetermined amounts during the upward movement of the table. The head 78 and rods 85—85 are urged downwardly by springs 88—88 interposed between the shoulders formed on the rods 85 and by the apertures 86. The posts 85 also prevent rotation of the head 78.

The head 78 is provided with substantially vertical apertures 94—94 to receive rotatably and slidably therein feed tube members 95—95 (Figs. 7, 13, 14, 15 and 16) which are adapted to receive and frictionally support a helical supply of brazing wire 96, from which the coils or annuli 25 are formed. The feed tubes 95 extend above the recessed surface 98 of the head 78 and, at their upper ends, are provided with integral spur teeth which form spur gears 100. The spur gears 100 mesh with the internal teeth 101 of a ring gear 102 rotatably supported on the surface 98 of the head 78 and guided for rotary movement thereon by an annular rib 103 fitting in an annular groove 104 in the head 78. The ring gear 102 is provided with external teeth 108, which mesh with a spur gear 109 mounted on the upper end of a vertical shaft 110, which is suitably journalled in the frame member 34 and which is driven by a mechanism later to be described. A hand wheel 111 (Fig. 2) is fixed to the upper end of the shaft 110 for manually rotating the feed tubes 95 when applying a new supply of brazing wire 96 thereto.

The teeth of the spur gear 100 are cut to form a helical groove 112 in the gear and provide a helical cam 113 on the upper end of each feed tube 95. Stationary cam members 114, having oblique and arcuate ends 115 formed to fit in the groove 112, are secured to the head 78 by machine screws 116. The cam members 114 cooperate with the helical cam 113 so that, upon rotation of the gear 100, the feed tubes 95 will be moved axially up or down. It will thus be seen that, upon rotation of the ring gear 102, the feed tubes 95 are rotated about their own axes and moved up and down by the member 115 engaging in the spiral groove 112 to produce a helical motion and impart a helical feeding movement to the helical supply of brazing wire 96.

The brazing wire 96, as previously mentioned, is formed into a helix, the convolutions of which are compressed into tight engagement with each other to make the supply compact and to form, in effect, a tube which is adapted to pass through and frictionally engage the feed tubes 95 and be supported thereby. In order to facilitate the cutting off of a portion of the supply of brazing wire 96, the lower convolutions of the helix are expanded to a predetermined spacing or pitch and, for this purpose, expanding members 120 are provided (Figs. 14 and 15). The expanding members 120 comprise cylindrical plugs secured in the lower ends of the feed tubes 95 and are provided with helical peripheral grooves 121, into which the lower ends of the helical supply of brazing wire is threaded. The helical grooves 121 of the member 120 have the proper predetermined spacing so that the helical brazing wire 96, as it passes therethrough, is expanded to provide the proper pitch or spacing between adjacent convolutions thereof.

Cutting means are provided for each helical supply of brazing wire to sever a coil 25 of several convolutions from the supply 96 and comprises stationary cutting members 122 and movable cutting members 123 (Figs. 14, 15, 16, 17, 13 and 7). The movable cutting members 123 are integrally formed on and project downwardly from an annular mounting ring 124 secured to the lower end of the cylindrical block 80 by a pair of cap screws 125—125 (Fig. 7). Extending inwardly from each movable cutting member 123 are a pair of projections or jaws 127 and 128, which are obliquely disposed in the path of the helical brazing wire 96 and spaced apart to provide a groove 129 to receive a loop of the helical wire 96 therein (Figs. 14 to 17, inclusive). Each movable member 123 is formed with a flat vertical surface 131 radially disposed in alignment with the axis of the helical brazing wire 96 and forms a radially disposed cutting edge 132 on the jaw member 128.

The stationary cutting members 122 are each provided with an inwardly directed obliquely disposed projection or jaw 135 normally aligned with the jaw 128 of the movable cutting member 123 and each is disposed in the path of the helical brazing wire 96 and is adapted to fit between a pair of adjacent convolutions thereof (Fig. 14). The stationary cutting members 122 are each provided with a radially disposed flat vertical face 136, which slidingly engages the surface 131 of the movable cutting members 123 and forms a cutting edge 137 on the jaw 135 which, in cooperation with the cutting edge 132 of a movable cutting jaw, acts to sever the loop of the brazing wire 96 positioned therebetween when the movable cutting member 123 is moved upwardly.

As shown in Figs. 7, 13 and 17, the stationary cutting members 122 are formed integrally with and extend out from an annular member 138, which is secured to a mounting ring 139 by a pair of cap screws 140—140 (Fig. 7). The mounting ring 139 fits within the aperture 86 of the plate 39 and has secured thereto a pair of upwardly extending spacing rods 142—142 (Fig. 13), which pass through suitable apertures in the annular member 124 and the cylindrical block 80 and which are provided with enlarged ends 143—143. The ends 143—143 of the rods 142—142 bear against a pair of horizontally disposed pins 144—144 secured in the boss 76 by a pair of set screws 145—145. A pair of springs 147—147, interposed between the heads 143 of the rods 142 and shoulders 148 formed in the sides of the cylindrical member 80, serve to urge the rods 142 and the mounting for the stationary cutting members 122—122 upwardly against the stationary pins 144.

It will be apparent that with the cutting members 122 and 123 in their normal position, and with a loop of the helical supply of brazing wire 96 therebetween, as shown in Fig. 14, the loop interposed between the cutting edge 137 and 132 will be severed by an upward movement of the movable cutting member 123. The cutting members 122 are fixed against movement upwardly but are yieldingly mounted to permit downward movement thereof to facilitate the removal of scrap from the feed tubes.

An article 28 placed on one of the seats 70 is adapted to be positioned in alignment with the head 78 for each indexing movement of the table 45 and is arranged so that the eyelets 26 thereon and the positioning pins 73 extending therethrough are in vertical alignment with the lower ends of the coils of brazing wire 96. During the indexing of table 45, the roller 58 of the supporting member 50 rides on the horizontal surface 150 of the cam member 60. After the table 45 has been indexed, the table 45 is elevated as the cam member 60 moves to the right, as viewed in Fig. 2, and the roller 58 rides up the inclined surface 151. The upward movement of the table 45 is stopped with the table in a position shown in Fig. 7 while the roller 58 rides on the horizontal surface 152 of the cam member 60, in which position of the table the article 28 at station No. 2 is positioned adjacent the cut-off members 122 and 123 and the positioning pins 72 are positioned within the lowermost convolutions of the coils of the brazing wire 96 and the top surface of the table 45 engages the lower end of the rods 87.

During the dwell in the vertical movement of the table 45, while the roller 58 is riding on the surface 152 (Fig. 22), the ring gear 102 is rotated in a clockwise direction to advance each of the feed tubes 95 downwardly and feed two convolutions of each of the helices of brazing wire 96 between each of the cutting jaws 128 and 135, as shown in Figs. 14 and 17. As the cam member 60 continues its movement to the right, the roller 58 rides up the cam incline 153 and imparts a further upward movement to the table 45 and then rides on the horizontal surface 154 of the cam surface 60. The slight upward movement imparted to the table by the cam rise 153 is transmitted through the rods 87 to the head 78 and the movable cutting members 123 to grip a loop of each of the helical supplies of brazing wire 96 between the cutting edges 132 and 137 of the movable and stationary cutting jaws 128 and 135, respectively. While the brazing wire 96 is thus held by the cutting members, the feeding mechanism, later to be described, is operated to drive the feed tubes in the reverse direction and retract them relative to the helical wire and effect the emergence of two convolutions of the coil from the lower end of each of the feed tubes.

The table 45 is then further elevated by the cam rise 155 on the cam member 60 to raise the movable cutting members 123 further and sever the coils 25 from the supplies of brazing wire 96 (Fig. 5). The severed coils 25 of the brazing wire drop vertically onto the eyelets 26 of the article 28, the coils being guided onto the eyelets by the guide pins 72.

The construction of the means for rotating the ring gear 102 and driving the feed tubes 95 to feed the helices of brazing wire 96 in timed relation with the vertical movement of the table 45 will be apparent from the following. The ring gear 102 is driven by a gear 109 secured to the upper end of a shaft 110, which is journalled in suitable bearing apertures in the frame 34, as previously stated, and the shaft 110 is retained therein against axial displacement by collars 157 and 158 (Fig. 2). Attached to the lower end of the shaft 110 is a gear 160 (Figs. 18, 22 and 23) meshing with gear teeth 161 of a floating rack bar 162 (Fig. 20). The rack bar 162 is provided with guide portions or flanges 163—163 and is slidably mounted in ways 164 formed in a supporting member or block 165 apertured at 166 to rotatably receive the gear 160. Collars 167 and 168 (Fig. 18) pinned to the shaft 110 above and below the gear 160, respectively, serve to support the member 165 vertically on the shaft 110. Extending laterally from one end of the rack bar 162 is a triangular shaped lug 170 and at the opposite end the rack bar is formed with a cam surface 171.

The rack bar 162, slidably mounted in the supporting member 165, is moved toward the left, as viewed in Figs. 22 and 23, by a contractile spring 173, which is secured at one end to a stationary pin 174 and, at its other end, to a pin 175 extending horizontally from the rack bar 162. The spring 173, through the pin 175, also tends to turn the rack bar 162 and the supporting member 165 clockwise about the shaft 110 and moves the lug 170 of the rack bar into engagement with the side of the cam member 60 (Fig. 23), which limits the turning movement thereof. The lug 170 of the rack bar 162 slidably engages the side of the cam member 60 and is located in the path of movement of a pin 178 extending from the side of the cam member 60.

As the cam bar 60 moves to the right, the pin 178 thereon will engage the lug 170 of the rack bar 162 and move the rack bar to the right, as viewed in Fig. 23. As the rack bar 162 continues its movement to the right, the cam surface 171 thereon engages a stationary vertical pin 180 and cams the rack bar in a counterclockwise direction to move the lug 170 out of the path of the pin 178, as indicated in dotted lines in Fig. 23, and disengage the driving connection between the pin 178 and the bar 162.

When the rack bar 162 has reached the position indicated in dotted lines in Fig. 23, the lug 170 is automatically engaged by a pivoted latching member 181 and is held stationary thereby until the latching member is actuated to release the rack bar. The latching member 181 is pivoted at 182 to a bracket 183 secured to the plate 36 and is urged upwardly or in a counter-clockwise direction, as viewed in Fig. 2, by a spring-pressed plunger 184 engaging a pin 186 on the latching member 181. The end of the latching member 181 is notched to provide horizontal and vertical shoulders 187 and 188 (Fig. 21), respectively, which engage the lug 170 of the rack bar 162.

This movement to the right of the rack bar 162 serves to rotate the shaft 110 and, through the gears 109, 102 and 100, reversely rotate the feed tubes 95 two complete revolutions. This reverse rotation of the feed tubes 95 occurs when the table 45 has been elevated to move each of the movable cutting jaws 128 to grip a loop of the helices of brazing wire 96 against the stationary cutting jaws 135 while the roller 58 of the supporting member 50 is riding on the horizontal surface 154 of the cam bar 60. During this reverse rotation of the feed tubes 95, the helical supplies of brazing wire 96 are held stationary and the feed tubes are retracted in a helical path two complete revolutions relative thereto to effect the spreading of two convolutions of the wire and the emergence of two convolutions of brazing wire from the lower end of the feed tubes 95.

At a later predetermined point in the movement to the right of the cam member 60, an actuating pawl 190 (Figs. 2 and 22) pivotally mounted on the cam member 60 will engage a cam lug 191 secured to the side of the latching member 181 and depress the latch 181 to disengage the shoulder 188 thereof from the lug 170 of the rack bar 162 and the rack bar 162 will then be rapidly moved to the left by the spring 173. This rapid movement of the rack bar 162 to the left will rotate the shaft 110 and, through the gears 109, 102 and 100, forwardly drive the feed tubes 95 two complete revolutions. This forward rotation of the feed tubes 95 occurs while the roller 58 of the supporting member 50 rides on the cam surface 152 of the cam bar 60 and serves to feed two convolutions of the helical supply of brazing wire 96 between the cutting jaws 128 and 135.

The members 52 and 60, as previously mentioned, are reciprocated through distances of predetermined length and at a controlled rate of movement by the fluid actuator 69. On the forward or right hand movement of the cam member 60, the table 45 is raised to its various levels, with the proper interval of dwell at each level, to raise the article 28 at station No. 2 into proximity with the supplies of brazing wire and to actuate the movable cutting members 123 to grip loops of brazing wire against the stationary cutting members 122 and hold the helical supplies of wire 96 for a predetermined interval of time and subsequently to sever coils 25 therefrom, and, in timed relation with the vertical movement of the table and the articles 28, the cam member 60, in its forward movement, acts, in cooperation with the spring 173 and other parts, to effect the recriprocation of the floating rack bar 162 to impart rotation to the drive mechanism for rotating the feed tubes 95 to feed successive lengths of brazing wire between the cutting jaws. On the return stroke of the cam member 60, the table is lowered to its initial starting position, as shown in Fig. 2, while the driving means for feeding the brazing wire remains idle.

During the last part of the return or left hand movement of the member 52, as viewed in Fig. 2, the hook 51 thereon engages one of the supporting rods 48 of the shaft 44 and rotates the shaft 44 and the table 45 through an arc of 90° and stops in the position indicated in dot and dash lines in Fig. 23. The member 52 is guided for horizontal movement in a slot 193 in the vertical wall 40 and is urged in a clockwise direction, as viewed from above, (Fig. 23) by a spring-pressed plunger 194 slidably engaging the edge thereof and yieldably mounted in a recess in the wall 40. On its forward movement, the member 52 is cammed laterally by the engagement of one of the rods 48 with the oblique cam surface 196 on the forward end of the member 52 until the surface 196 rides off the rod 48 and the member 52 is moved clockwise into engagement with the rods 48, as shown in full lines in Fig. 23. A suitable aperture is formed in the wall 41 to provide clearance for the member 52 during its reciprocation.

To maintain the table 45 in the various positions to which it is indexed and insure accurate alignment of the articles 28 with the various stations, the shaft 44 is provided with four equally spaced vertical V-shaped grooves 198—198 (Figs. 2, 5 and 6) which are adapted to receive and cooperate with a spring-pressed detent 199 mounted in a recess 200 in the intermediate plate member 37 of the frame 34. To prevent the inertia from carrying the table, when indexed, beyond its proper position, a drag or brake is constantly applied thereto by a plunger 202 (Fig. 5) slidably engaging the upper surface of the table. The plunger 202 is mounted for vertical movement in a housing 203 secured to the upper horizontal plate 39 and is urged downwardly by an expansion spring 204 to apply a continuous pressure against the table.

After the coils 25 of brazing wire have been assembled on the eyelets 26 of the article 28 at station No. 2, the table 45 is indexed and the article is advanced to station No. 3. As the article 28 is moved upwardly by the table 45 at station No. 3, the expanded coils 25 on the eyelets 26 engage a compressing die 206 (Figs. 5, 4 and 3) secured to the upper frame plate 39 by a cap screw 207 and are compressed so that the convolutions thereof are in tight engagement with each other, as indicated in Fig. 11. The die 221 is provided with recesses 208 to receive and provide clearance for the eyelet members 26 and the positioning pins 72.

When the table 45 is lowered and again indexed, the article 25 is positioned at station No. 4 and the eyelets 26 on the article 28 are in vertical alignment with flaring tools 210 (Figs. 7, 4 and 3) secured to and projecting downwardly from the frame plate 39. The ends of the eyelets 26 on the article 28, when moved upwardly by the table 45, engage the tapering ends 211 of the flaring tools 210 and are flared outwardly thereby (Fig. 12).

A reciprocable disc 213 (Fig. 7) formed on the lower end of the stem 214 and apertured to receive the flaring tools 210, is engageable with the upper edges of the eyelets 26 and serves as a stripper therefor should the eyelets 26 become wedged onto the flaring tools 210. The stripper member 213 is moved upwardly by the engagement therewith of the eyelets 26 and is positively moved downwardly in timed relation with the rest of the apparatus by a lever 215 pivotally mounted at 216 in a bracket 217 secured to the plate 39 (Fig. 7). The lever 215 is actuated by the engagement therewith of one end of a bar 218 slidably mounted in the plates 37, 38 and 39 adjacent the vertical wall 40 for vertical reciprocation. The bar 218 is provided at its lower end with a roller 219, which rides upon the upper horizontal surfaces 220 and 221 and the inclined cam surface 222 of the bar 52 as it is horizontally reciprocated, to actuate the stripper member 213 through the bar 218 and the lever 215.

During the operation of the apparatus, the fluid actuator 67 is continuously operated and the actuating members 52 and 60 are continuously reciprocated at a controlled rate of movement to vertically reciprocate the table 45 and in timed relation thereto index the table through angular movements of 90° and, in synchronized relation with the movements of the table, actuate the driving mechanism to feed the supplies of brazing wire 96. An operator may apply an article 28 onto the seat 70 at station No. 1 with the eyelets 26 fitting around the positioning pin 72 while the table 45 is in its lowermost position and during its period of dwell. The table 45 is then indexed on the last portion of the return movement of the actuating member 52, which carries the article 28 to station No. 2. Another article 28 may be applied to the seat 70 at station No. 1. As the cam member 60 starts its movement to the right, as viewed in Fig. 2, the roller 58 will ride up the inclined surface 151 of the cam member 60 and elevate the table 45 and raise the articles 28 at station No. 2 to the position indicated in Fig. 7, at which elevation the table will dwell as the roller 58 rides on the surface 152 of the cam member 60. While the table 45 is in this intermediate position and the roller 58 rides on the surface 152, the pawl 190 (Fig. 22) and cams the latching member 181 downwardly to disengage the latch 181 from the rack bar 162 while the bar 162 is in its right hand position, as indicated in Fig. 2 in full lines and in Fig. 23 in dotted lines. The rack bar 162, under the influence of the spring 173, will be rapidly moved to the left, as viewed in Figs. 2 and 23, to rotate the gear 160 and the shaft 110, and through the gear 109 fixed to the upper end thereof, rotate the ring gear 102 and the gears 100 of the feed tubes 95 in a clockwise direction, as viewed from above. This clockwise rotation of the feed tubes 95 will advance the feed tubes and the ends of the brazing wire projecting from the lower ends thereof downwardly in a spiral path and feed two convolutions of the wire through the spaced cutting jaws 128 and 135 of the cutting members, as shown in Fig. 14.

As the cam bar 60 continues its movement to the right, the roller 58 will ride up the inclined surface 153 to further elevate the table 45 a small amount, which movement is transmitted through the rods 87 to the head 78 to raise the movable cutting member 123 sufficiently to grip the loops of the helices of brazing wire between the movable and stationary cutting jaws 128 and 135. While the table is at this elevation and the roller 58 is riding on the horizontal surface 154 of the cam member 60 and the coils of brazing wire are firmly gripped by the cut-off jaws, the pin 178 on the cam member 60 engages the lug 170 of the rack bar 162 and moves it to the right to rotate the feed tube driving mechanism in the reverse direction. Thus, while the helices of wire 96 are firmly gripped and held stationary, the feed tubes 95 are reversely driven and retracted in helical paths relative to the wire 96 to spread the convolutions of the helical wires as they pass through the expanding members 120 and displace or uncover two convolutions of wire from each of the lower ends of the tubes 95. On completion of the reverse movement of the feed tube driving mechanism, the roller 58 rides over the cam rise 155 of the cam member 60 and further elevates the table 45, which upward movement is transmitted through the rods 87 to the head 78 and to the movable cutting members 123 which, in cooperation with the stationary cutting members 122, sever the coils 25 from the helical supplies of brazing wire 96, as shown in Fig. 15. The severed coils 25 will be guided by the positioning pins 72 onto the eyelets 26 of the article 28.

On the reverse or return movement of the cam member 60, and the member 52, the table and the article 28 carried thereby will be lowered and, toward the end of the reverse movement, the hook 51 of the member 52 will engage one of the supporting rods 48 and rotate the table through an arc of 90°. The article 28 previously at station No. 2 will be advanced to station No. 3 and the article at station No. 1 will be advanced to station No. 2 and another article may be applied to the seat 70 at station No. 1. As the actuating members 52 and 60 are moved forward on another cycle of operation, the table 45 will be raised to move the article at station No. 3 upwardly and move the coils 25 on the eyelets 26 into engagement with the compressing die 206 to compress the coils 25 (Fig. 11). On the return movement of the members 52 and 60, the table is indexed to advance the article previously at station No. 3 to station No. 4. Another article 28 may be applied to the seat 70 at station No. 1 and as the table is again elevated during the following cycle, the ends of the eyelets at station No. 4 on the article 28 are moved into engagement with the flaring tools 210 and flared outwardly thereby (Fig. 12). When the table 45 is again indexed, the article 28, with coils 25 assembled thereon, may be removed from the seat 70 at station No. 1 and another article 28 applied thereon. It will be apparent that during the operation of the apparatus, articles 28 will be positioned at each of stations 2, 3 and 4 and simultaneously acted upon by the mechanism associated with each station, and at station No. 1 the assembled articles may be removed from the apparatus and other unfinished articles 28 applied thereto.

What is claimed is:

1. In a forming and assembling apparatus, a movable feed tube for frictionally supporting a supply of material in the form of a helix, a pair of cooperating relatively movable cutting members in the path of movement of the helix and normally spaced apart to receive a loop of the helix therebetween, a reciprocable actuating member, reversible driving means including a reciprocable rack bar operatively associated with the actuating member for simultaneously rotating and axially moving the feed tube in opposite directions to move the helix in a predetermined helical path, means on the actuating member engageable with the rack bar for moving the rack bar and driving means in one direction, means for disconnecting the driving connection between the rack bar and the actuating member to limit the movement thereof in one direction, latching means engageable with the rack bar for holding the rack bar and the driving means at the end of movement in one direction, means for urging the rack bar and the driving means for movement in the opposite direction, means associated with the actuating member to disconnect the latch member from the rack bar in a predetermined position of the actuating member during its movement in one direction, whereupon the rack bar and the driving means are rapidly moved in reverse direction, a vertically movable member for supporting an article thereon in vertical alignment with the helix and for actuating one of the cutting members, and cam surfaces on the actuating member cooperating with the vertically movable article supporting member to raise and lower the member to various levels and move the article into proximity to the helix whereby, as the article supporting member is raised, one of the cutting members is actuated to grip the helix against the other cutting member while the feed tube is reversely moved and then further actuated to sever a portion of the helix.

2. In a forming and assembling apparatus, a movable feed tube to frictionally support a helical element, reversible driving means including a reciprocable actuating member for simultaneously rotating and axially moving the feed tube in opposite directions to move the helical element in a predetermined helical path, a pair of cooperating relatively movable cutting members positioned between convolutions of the helical element and normally spaced apart to receive a convolution of the helical element therebetween, a movable supporting table for supporting a part in vertical alignment with the helical element and for actuating one of the cutting members to sever a portion of the helical element, an actuating member, cam surfaces on the actuating member for raising and lowering the table to various elevations to move the article supported thereon into proximity with the helical element and to impart interrupted movement to one of the cutting members whereby the cutting member is sequentially moved first to grip the helical element against the other cutting member and hold it stationary while the feed tube is retracted relative thereto and later moved to sever a portion of the helical element whereby the severed portion of the helical element is deposited on the article.

3. In a forming and assembling apparatus, a movable feed tube to frictionally support a helix in a substantially vertical position, reversible drive means for simultaneously rotating and axially moving the feed tube to move the helix in a predetermined helical path along a substantially vertical axis, means for holding the helix stationary during the reverse movement of the feed tube to effect a relative movement between the feed tube and the helix, a pair of cooperating relatively vertically movable cutting members in the path of travel of the helix and normally spaced apart to receive a convolution of the helix therebetween, and a vertically movable member for supporting an article in alignment with the helix and for actuating one of the cutting members whereby said vertically movable supporting member may be moved to actuate one of the cutting tools to sever a portion of the helix and to position the article in close proximity to the helix to receive the severed portion thereof.

4. In a forming and assembling apparatus, a movable feed tube for frictionally supporting a helix having closely positioned convolutions, reversible drive means for simultaneously rotating and axially moving the feed tube to advance the helix in a predetermined helical path, means for holding the helix stationary during the reverse movement of the feed tube to effect a relative movement between the feed tube and the helix, means associated with the feed tube for imparting a predetermined spacing of the convolutions of the helix as the feed tube is moved relative thereto, a pair of relatively movable cutting members in the path of movement of the helix and normally spaced apart to receive a convolution of the helix therebetween, a movable supporting member having a positioning element for supporting an article in alignment with the helix, said supporting member being movable in a path substantially parallel to the axis of the helix to actuate one of the cutting tools to sever a portion of the helix and to move the end of the positioning element into the helix to guide the severed portion of the helix onto the article.

5. In a forming and assembling apparatus, a movable feed tube for frictionally supporting a helix, reversible drive means for simultaneously rotating and axially moving the feed tube to move the helix in a predetermined helical path, means for holding the helix stationary during the reverse movement of the feed tube to effect a relative movement between the feed tube and the helix, a pair of relatively movable cutting members in the path of movement of the helix and normally spaced apart to receive a convolution of the helix therebetween, a movable supporting member having a positioning element for supporting an article in alignment with the helix, said supporting member being movable in a path substantially parallel to the axis of the helix to actuate one of the cutting tools to sever a portion of the helix and to move the end of the positioning element into the helix to guide the severed portion of the helix onto the article.

6. In a forming and assembling apparatus, means for intermittently advancing a preformed helix in a helical path along a substantially vertical axis, a pair of relatively vertically movable cutting members fitting between the convolutions of the helix and normally spaced apart for receiving a loop of the helix therebetween, a vertically movable supporting member for positioning an article in vertical alignment with the helix and for actuating one of said cutting members, and means for moving said supporting member vertically to move an article adjacent to said helix and to actuate one of the cutting members whereby a portion of the helix will be severed and deposited on the article.

7. In a forming and assembling apparatus, a movable feed tube for frictionally supporting a helical element, means for simultaneously rotating and axially moving the tube to advance the helical element in a predetermined helical path, a stationary cutting member positioned between a pair of convolutions of the helical element, a movable cutting member positioned between a pair of convolutions of the helical element and normally spaced from the stationary cutting member to receive a convolution of the helical element therebetween, said movable cutting member being movable relative to the stationary cutting member in a path substantially parallel to the axis of the helical element for cutting the convolution of the helical element positioned therebetween to sever a portion of the helical element, reciprocable means for supporting a part thereon and for actuating the movable cutting member, and a guide member on the reciprocable means for positioning the part thereon in alignment with the helical element and being movable into the helical element for guiding the severed portion of the helical element onto the part.

8. In a forming and assembling apparatus, a movable feed tube to frictionally support a helical element having closely positioned convolutions, reversible drive means for simultaneously rotating and axially moving the feed tube to advance the helical element in a predetermined helical path, means for holding the helical element stationary during the reverse movement of the feed tube to effect a relative movement between the feed tube and the helical element, and means associated with the feed tube for imparting a predetermined spacing to the convolutions of the helical element as the feed tube is moved relative thereto.

9. In a forming and assembling apparatus, a movable feed tube to frictionally support a helical element having closely positioned convolutions, means associated with said feed tube for imparting a predetermined spacing to the convolutions of the helical element, reversible drive means for simultaneously rotating and axially moving the feed tube to advance the helical element in a predetermined helical path, a pair of relatively movable cooperating cutting members adapted to fit between the convolutions of the element in the path of travel of the helical element and normally spaced apart to receive a loop of the helical element therebetween, and means for actuating one of said cutting members sequentially to grip the loop and hold the helical element stationary while the feed tube is retracted relatively thereto and later to sever a portion of the helical element.

10. In a forming and assembling apparatus, a movable feed tube for frictionally supporting a helical element therein, reversible driving means for simultaneously rotating and axially moving said feed tube to advance the helical element in a predetermined helical path, a stationary cutting member positioned between a pair of convolutions of the helical element, a movable cutting member positioned between a pair of convolutions and spaced from the stationary cutting member to receive a loop of the helical element therebetween, and means for sequentially moving the movable cutting member to grip the helical element and hold it stationary while the feed tube is being reversely moved relatively thereto and later to sever a portion of the helical element.

11. In a forming and assembling apparatus, a movable feed tube for frictionally supporting a helical element therein, means for simultaneously rotating and axially moving the tube to advance the helical element in a predetermined helical path, means for retracting the feed tube, means for holding the helical element in its advanced position while the feed tube is being retracted, a pair of relatively movable cutting members in the path of travel of the helical element and spaced apart to receive a loop of the helical element therebetween, and means for actuating one of said cutting members to sever a portion of the helical element.

12. In a forming and assembling apparatus, a movable feed tube for frictionally supporting a helical element therein, reversible driving means for simultaneously rotating and axially moving said feed tube in opposite directions to move the helical element in a predetermined helical path, means for holding the helical element stationary while the tube is being reversely driven whereby the tube is moved relative to the helical element, and means for severing a portion of said helical element.

13. In a forming and assembling apparatus, a movable feed tube for frictionally supporting a helical element within said feed tube for movement therewith and for movement relative thereto, means for simultaneously rotating and axially moving the tube to move the helical element in a predetermined helical path, a pair of relatively movable cutting members disposed in spaced relation to said feed tube and in the path of travel of the helical element and spaced apart to receive a loop of the helical element therebetween, and means for actuating one of said cutting members to sever a portion of the helical element.

14. In an apparatus of the character described, the combination of a movable feed element for supporting a helix for movement therewith and for movement relative thereto along a predetermined axis, drive means for rotating and advancing said feed element along said predetermined axis to advance said helix a predetermined distance through a predetermined helical path, means for retracting said feed element, means for holding said helix against movement while said feed element is retracted to effect the movement of the feed element relative to the helix, and cutting means for severing a portion of the helix.

15. In an apparatus of the character described, the combination of a movable feed element for supporting a helix for movement therewith and for movement relative thereto along a predetermined axis, cutting means mounted in the path of movement of said helix, drive means for rotating and advancing said feed element along said axis to advance said helix a predetermined distance through a predetermined helical path into said cutting means, means for retracting said feeding element, means for holding said helix against movement while said feed element is retracted to effect a movement of the feed element relative to said helix, and means for actuating said cutting means to sever a portion of said helix.

16. In an apparatus of the character described, the combination of a movable feed element for supporting a helix for movement therewith and for movement relative thereto along a predetermined axis, a pair of relatively movable cutting jaws positioned in the path of movement of said helix normally spaced apart for receiving a convolution of said helix therebetween, drive means for rotating and advancing said feed element along said axis to advance said helix a predetermined distance through a predetermined helical path into said jaws and for retracting said feed element, and means for sequentially moving the cutting jaws to grip said helix to hold it against movement while said feed element is retracted and then to sever a portion of said helix.

17. In an apparatus of the character described, a movable feed element for supporting a helix having closely positioned convolutions for movement therewith and for movement relative thereto along a predetermined axis, drive means for rotating and axially reciprocating said feed element along said axis to advance said helix in a predetermined helical path, means for holding the helix against movement while the feed member is retracted, and a spreader member on said feed element for imparting a predetermined spacing to the convolutions of the helix as the feed element is moved relative thereto.

18. In an apparatus of the character described, the combination of a movable feed element for supporting a helix for movement therewith and for movement relative thereto along a predetermined axis, drive means for rotating and axially advancing and retracting said feed element along said axis to advance said helix in a predetermined helical path, a pair of relatively movable cutting jaws positioned in the path of movement of said helix for receiving a convolution of the helix therebetween, means including a member movable into engagement with one of said cutting jaws to actuate said jaws to hold said helix therebetween against movement while said feed element is retracted and to further actuate said jaws to sever a portion of said helix, and a guide on said member for positioning a part thereon in alignment with the helix and movable with said member into the end portion of said helix for guiding the severed portion of the helix onto said part.

19. In an apparatus of the character described, the combination of means for intermittently advancing a helix in a helical path, a pair of relatively movable cutting members positioned in the path of movement of said helix and between pairs of adjacent convolutions of the helix for receiving a loop of the helix therebetween, a movable supporting member for positioning an article in alignment with the helix and for actuating one of said cutting members, means for moving said supporting member to move an article thereon toward said helix and to actuate one of the cutting members to sever a portion of said helix of material, and guide means on said movable supporting member for guiding the severed portion of said helix onto said article.

JOHN S. STULL.

REFERENCES CITED

The following references are of record in the file of this patent:

UNITED STATES PATENTS

| Number | Name | Date |
| --- | --- | --- |
| 1,352,842 | Sleeper | Sept. 14, 1920 |
| 1,941,045 | Plumb | Dec. 26, 1933 |
| 2,096,080 | Berne-Allen | Oct. 19, 1937 |